US007916343B2

(12) United States Patent
McCarthy et al.

(10) Patent No.: US 7,916,343 B2
(45) Date of Patent: Mar. 29, 2011

(54) METHOD OF ENCODING A LATENT IMAGE AND ARTICLE PRODUCED

(75) Inventors: Lawrence David McCarthy, Noble Park North (AU); Gerhard Frederick Swiegers, Vermont South (AU)

(73) Assignee: Commonwealth Scientific and Industrial Research Organisation, Capital Territory (AU)

( * ) Notice: Subject to any disclaimer, the term of this patent is extended or adjusted under 35 U.S.C. 154(b) by 1096 days.

(21) Appl. No.: 10/562,301

(22) PCT Filed: Jul. 7, 2004

(86) PCT No.: PCT/AU2004/000915

§ 371 (c)(1),
(2), (4) Date: Nov. 1, 2006

(87) PCT Pub. No.: WO2005/002880

PCT Pub. Date: Jan. 13, 2005

(65) Prior Publication Data

US 2007/0098961 A1 May 3, 2007

(30) Foreign Application Priority Data

Jul. 7, 2003 (AU) ................................ 2003903501
Oct. 24, 2003 (AU) ................................ 2003905861

(51) Int. Cl.

| | |
|---|---|
| ***G06K 15/02*** | (2006.01) |
| ***G06K 19/06*** | (2006.01) |
| ***B41M 3/14*** | (2006.01) |
| ***B42D 15/00*** | (2006.01) |
| ***G09C 1/00*** | (2006.01) |
| ***G09C 5/00*** | (2006.01) |

(52) U.S. Cl. ......... 358/1.9; 358/3.28; 358/1.14; 283/73; 283/93; 283/17; 283/902; 380/55

(58) Field of Classification Search ................. 358/3.28, 358/1.9, 1.14, 1.18; 283/91, 93, 94, 113, 283/17, 73, 902; 235/487, 488, 494; 380/54, 380/59

See application file for complete search history.

(56) References Cited

U.S. PATENT DOCUMENTS 4,143,967 A 3/1979 Wicker et al. .................. 355/77

(Continued)

FOREIGN PATENT DOCUMENTS

AU 02/00551 11/2002

(Continued)

OTHER PUBLICATIONS

Derwent Abstract of JP 2001130125-A.

(Continued)

*Primary Examiner* — Scott A Rogers
(74) *Attorney, Agent, or Firm* — Ladas & Parry, LLP

(57) ABSTRACT

There is disclosed a method of encoding a latent image. The method comprises providing a latent image to be encoded, the latent image having a plurality of latent image elements, each latent image element having a visual characteristic which takes one of a predetermined set of values, providing a secondary pattern having a plurality of secondary image elements, the secondary pattern being capable of decoding the latent image once the latent image has been encoded, relating the latent image elements to the secondary image elements, and forming a primary pattern comprising a plurality of primary image elements which correspond to the secondary image elements displaced in accordance with the value of the visual characteristic of the latent image elements to which said secondary image elements are related.

60 Claims, 9 Drawing Sheets

U.S. PATENT DOCUMENTS

| | | | | |
|---|---|---|---|---|
| 4,586,711 | A | 5/1986 | Winters et al. | 273/138.1 |
| 4,632,430 | A | 12/1986 | Wicker | 283/97 |
| 4,668,597 | A | 5/1987 | Merchant | 430/22 |
| 4,684,593 | A | 8/1987 | Wicker | 430/6 |
| 4,897,802 | A | 1/1990 | Atkinson et al. | 40/362 |
| 4,914,700 | A | 4/1990 | Alasia | 380/54 |
| 5,035,929 | A | 7/1991 | Myers et al. | 428/30 |
| 5,178,418 | A | 1/1993 | Merry et al. | 283/73 |
| 5,271,645 | A | 12/1993 | Wicker | 283/92 |
| 5,301,981 | A | 4/1994 | Nesis | 283/73 |
| 5,374,976 | A | 12/1994 | Spannenburg | 399/366 |
| 5,396,559 | A * | 3/1995 | McGrew | 380/54 |
| 5,403,040 | A | 4/1995 | Mowry, Jr. | 283/91 |
| 5,428,479 | A | 6/1995 | Lee | 359/567 |
| 5,437,897 | A * | 8/1995 | Tanaka et al. | 428/29 |
| 5,454,598 | A | 10/1995 | Wicker | 283/67 |
| 5,536,045 | A | 7/1996 | Adams | 283/67 |
| 5,708,717 | A | 1/1998 | Alasia | 380/51 |
| 5,722,693 | A | 3/1998 | Wicker | 283/67 |
| 5,734,752 | A | 3/1998 | Knox | 358/3.28 |
| 5,735,547 | A | 4/1998 | Morelle et al. | 283/67 |
| 5,772,249 | A | 6/1998 | Guex et al. | 283/93 |
| 5,784,200 | A | 7/1998 | Modegi | 359/567 |
| 5,788,285 | A | 8/1998 | Wicker | 283/93 |
| 5,790,703 | A | 8/1998 | Wang | 358/3.28 |
| 5,825,547 | A | 10/1998 | Lee | 359/567 |
| 5,999,280 | A | 12/1999 | Huang | 359/2 |
| 6,000,332 | A | 12/1999 | Hruby et al. | 101/129 |
| 6,014,500 | A | 1/2000 | Wang | 358/1.9 |
| 6,088,161 | A | 7/2000 | Lee | 359/567 |
| 6,104,812 | A | 8/2000 | Koilati et al. | 380/51 |
| 6,198,545 | B1 | 3/2001 | Ostromoukhov et al. | 358/3.09 |
| 6,249,588 | B1 | 6/2001 | Amidror et al. | 382/100 |
| 6,252,971 | B1 | 6/2001 | Wang | 382/100 |
| 6,286,873 | B1 | 9/2001 | Seder | 283/117 |
| 6,324,009 | B1 | 11/2001 | Conley | 359/619 |
| 6,373,965 | B1 | 4/2002 | Liang | 382/112 |
| 6,414,757 | B1 | 7/2002 | Salem | 358/3.28 |
| 6,494,491 | B1 | 12/2002 | Zeiter et al. | 283/91 |
| 6,542,629 | B1 | 4/2003 | Wu et al. | 382/135 |
| 6,859,534 | B1 | 2/2005 | Alasia | 380/51 |
| 6,865,001 | B2 * | 3/2005 | Long et al. | 359/2 |
| 2002/0041712 | A1 | 4/2002 | Roustaei | 382/199 |
| 2002/0102007 | A1 | 8/2002 | Wang | 382/100 |
| 2002/0106102 | A1 | 8/2002 | Au et al. | 382/100 |
| 2002/0136429 | A1 | 9/2002 | Stach et al. | 382/100 |
| 2003/0012374 | A1 | 1/2003 | Wu et al. | 380/44 |
| 2003/0030271 | A1 | 2/2003 | Wicker | 283/113 |
| 2003/0228014 | A1 | 12/2003 | Alasia et al. | 380/53 |
| 2004/0001611 | A1 | 1/2004 | Celik et al. | 382/100 |
| 2004/0036272 | A1 | 2/2004 | Mathys | 283/72 |
| 2004/0188528 | A1 | 9/2004 | Alasia et al. | 235/468 |
| 2004/0264737 | A1 | 12/2004 | Alasia et al. | 382/100 |
| 2005/0052017 | A1 | 3/2005 | Alasia et al. | 283/72 |
| 2005/0053234 | A1 | 3/2005 | Alasia et al. | 380/54 |
| 2005/0123134 | A1 | 6/2005 | Alasia | 380/54 |
| 2005/0184504 | A1 | 8/2005 | Alasia et al. | 283/72 |
| 2007/0110317 | A1 * | 5/2007 | Davis et al. | 382/199 |
| 2008/0018097 | A1 * | 1/2008 | Wicker et al. | 283/91 |

FOREIGN PATENT DOCUMENTS

| | | | |
|---|---|---|---|
| AU | 2003905861 | | 10/2003 |
| AU | 2004900187 | | 1/2004 |
| AU | 2003905861 | | 7/2004 |
| AU | 2004/00746 | | 12/2004 |
| CA | 1066109 | | 11/1979 |
| CA | 1172282 | | 7/1984 |
| CA | 2224758 | | 12/1998 |
| CN | 1372234 | A | 2/2002 |
| DE | 3634865 | | 6/1987 |
| DE | 200 12 149 | U1 | 2/2001 |
| EP | 105 099 | | 4/1984 |
| EP | 0 204 552 | A2 | 12/1986 |
| EP | 0 256 176 | | 2/1988 |
| EP | 330 738 | | 9/1989 |
| EP | 0 490 923 | B1 | 6/1992 |
| EP | 0 642 933 | B1 | 5/1998 |
| EP | 0 967 091 | | 12/1999 |
| EP | 0967091 | A | 12/1999 |
| EP | 1 283 103 | A1 | 2/2003 |
| JP | 07-244343 | | 9/1995 |
| JP | 09-009071 | | 1/1997 |
| NE | 1015611 | | 1/2002 |
| WO | 91/03747 | | 3/1991 |
| WO | 93/24334 | | 12/1993 |
| WO | 93/24334 | A | 12/1993 |
| WO | 95/02200 | | 1/1995 |
| WO | 96/32689 | | 10/1996 |
| WO | 97/40464 | | 10/1997 |
| WO | 99/26793 | | 6/1999 |
| WO | 99/26793 | A | 6/1999 |
| WO | 99/39322 | | 8/1999 |
| WO | 00/02067 | | 1/2000 |
| WO | 00/67356 | | 11/2000 |
| WO | 01/00426 | | 1/2001 |
| WO | 01/39138 | | 5/2001 |
| WO | 01/55777 | | 8/2001 |
| WO | 01/80512 | A2 | 10/2001 |
| WO | 02/15133 | A1 | 2/2002 |
| WO | 02/23481 | A1 | 3/2002 |
| WO | 02/40291 | A2 | 5/2002 |
| WO | 02/091033 | A2 | 11/2002 |
| WO | 03/011606 | | 2/2003 |
| WO | 03/052680 | A1 | 6/2003 |
| WO | 2004/033229 | | 4/2004 |
| WO | 2004/036507 | | 4/2004 |
| WO | 2004/068421 | | 8/2004 |
| WO | 2004/088905 | | 10/2004 |
| WO | 2004/088905 | A2 | 10/2004 |
| WO | 2004/096570 | A2 | 11/2004 |
| WO | 2004/110773 | A1 | 12/2004 |
| WO | 2005/006025 | A2 | 1/2005 |
| WO | 2005/022972 | A2 | 3/2005 |
| WO | 2005/033855 | | 4/2005 |
| WO | 2005/034501 | A2 | 4/2005 |
| WO | 2005/062910 | A2 | 7/2005 |
| ZA | 2002/7084 | | 4/2003 |

OTHER PUBLICATIONS

Derwent Abstract of 94-275751/34 relates to JP 06206394.

Derwent Abstract of 98-134949/13 relates to JP 10010956.

Derwent Abstract of 2002-210241/27 relates to JP 2002032023.

Derwent Abstract of 2001-370403 relates to JP 2001105800-A.

Derwent Abstract of 2002-200428/26 relates to 2002032023-A.

Derwent Abstract of 2001-599594/68, T05, JP 2001-130125 A.

Hartung, et al., "Fast Public-Key Watermarking of Compressed Video," *Proceedings of IEEE International Conference of Image Processing* (Oct. 1997).

"Riemersma dither",retrieved from www.compuphase.com/riemer.htm.

Spannenberg, S., Optical Document Security, Ch. 8, pp. 169-199 (1998).

* cited by examiner

Fig 4a
Used for shade 28
Fig 4b
Used for shade 98
Fig 4c
Used for shade 164
Fig 4d
Used for shade 228
Shade 28
Fig 5a
Shade 98
Fig 5b
Shade 164
Fig 5c
Shade 228
Fig 5d

METHOD OF ENCODING A LATENT IMAGE AND ARTICLE PRODUCED

The present application claims priority of Australian provisional patent applications 2003903501 and 2003905861, the disclosures of which are incorporated herein by reference.

FIELD OF THE INVENTION

The present invention relates to a method of encoding a latent image. Embodiments of the invention have application in the provision of security devices which can be used to verify the legitimacy of a document or instrument, for example, a polymer banknote.

BACKGROUND OF THE INVENTION

In order to prevent unauthorised duplication or alteration of documents such as banknotes, security devices are often incorporated within banknotes as a deterrent to copyists. The security devices are either designed to deter copying or to make copying apparent once copying occurs. Despite the wide variety of techniques which are available, there is always a need for further techniques which can be applied to provide a security device.

SUMMARY OF THE INVENTION

The invention provides a method of encoding a latent image, the method comprising:

a) providing a latent image to be encoded, the latent image having a plurality of latent image elements, each latent image element having a visual characteristic which takes one of a predetermined set of values;

b) providing a secondary pattern having a plurality of secondary image elements, the secondary pattern being capable of decoding said latent image once the latent image has been encoded;

c) relating the latent image elements to the secondary image elements; and d) forming a primary pattern comprising a plurality of primary image elements which correspond to said secondary image elements displaced in accordance with the value of the visual characteristic of the latent image elements to which said secondary image elements are related.

The image elements are typically pixels (i.e. the smallest available picture element), however, the image elements may be larger than pixels in some embodiments—e.g. each image element might consist of 4 pixels.

The visual characteristic typically relates to the density of the image elements. That is, where the latent image is a gray-scale image, the visual characteristic may be a gray-scale value and where the latent image is a colour image, the visual characteristic may be a saturation value of the hue of the image element.

The number of values in the predetermined set of values of the visual characteristic is typically dependent on the configuration of the secondary pattern. The secondary pattern typically consists of rectangular groups of image elements arranged in such a way that if the secondary pattern were superimposed upon itself at a certain displacement it would eclipse it's own image. The number of image elements in each group of image elements limits the number of values in the predetermined set of values.

For example, a typical secondary pattern for use in encoding a gray-scale latent image is a rectangular array consisting of a plurality of pure opaque vertical lines, each line being N pixels wide and separated by pure transparent lines of the same size. Such a secondary pattern can be used to encode a latent image having up to N+1 different gray-scale values.

In one embodiment the number of visual characteristics (S) is determined in accordance with the equation:

$$S=(WR/25.4X)+1, \text{ where:}$$

W is the to be printed width of the primary pattern;

R is the printer resolution in image dots per square inch; and

X is the width of the primary pattern in pixels.

In some embodiments, relating the latent image elements to the secondary image elements involves associating the latent image elements with secondary image elements, whereafter the secondary image elements are displaced in dependence on the value of the visual characteristic of the latent image elements with which they are associated.

In other embodiments, relating the latent image elements to the secondary image elements comprises separating the latent image into a plurality of masks corresponding to each value of the visual characteristic, forming a plurality of displaced partial secondary patterns, and using the masks to modify the plurality of displaced partial secondary patterns and combining the modified displaced partial patterns to form said primary pattern.

Typically, the secondary pattern and the latent image will be rectangular and hence their image elements will be arranged in a rectangular array. Accordingly, displacing image elements will usually involve displacing image elements along an axis of the rectangular array. However, the image elements may be arranged in other shapes.

In one embodiment where image elements are displaced along the horizontal axis of the array and there are S different values of the visual characteristic, secondary image elements associated with latent image elements having a first value of the visual characteristic are displaced horizontally by one image element, and each subsequent visual characteristic is displaced by a further image element so that the $S^{th}$ shade is displaced by S image elements.

However, any number of different displacement schemes may be used. For example, the image elements may be displaced in accordance with the formula: displacement (D)=(N−1)* $[(S-S_{min})/(S_N-S_{min})]$; where S is the value of the visual characteristic being displaced, $S_{min}$ is the sparsest density value of the visual characteristic and $S_N$ is the densest value of the visual characteristic.

Typically, the method will involve forming the latent image from an original image by image processing an original image to reduce the number of values of the visual characteristic in the original image to the number of values required in the latent image.

The invention also provides a method of encoding a plurality of latent images, the method comprising:

a) providing a plurality of latent images to be encoded, each latent image having a plurality of latent image elements, each latent image element having a visual characteristic which takes one of a predetermined set of values;

b) providing at least one secondary pattern, each at least one secondary pattern having a plurality of secondary image elements, each secondary pattern being capable of decoding one or more of said latent images once the latent images have been encoded;

c) relating the latent image elements to the secondary image elements of the secondary pattern which is to decode the latent image;

d) forming a primary pattern for each primary pattern comprising a plurality of primary image elements which correspond to said secondary image elements displaced in accordance with the value of the visual characteristic of the latent image elements to which said secondary image elements are related; and e) combining said primary patterns at angles to one another to form a composite primary pattern encoding each of said latent images.

The invention also provides a primary pattern encoding a latent image, said primary pattern comprising:

a plurality of primary image elements which can be decoded by a secondary pattern comprising a plurality of secondary image elements, said primary image elements being displaced relative to respective ones of said secondary image elements, the displacement being determined on the basis of the value of the visual characteristic of latent image elements related to respective ones of said secondary image elements.

The invention also provides a primary pattern as claimed in claim 29 wherein said primary pattern is embossed on a polymer substrate.

Further features of the invention will become apparent from the following description of preferred embodiments of the invention.

BRIEF DESCRIPTION OF THE DRAWINGS

The preferred embodiments will be described with reference to the accompanying drawing in which:

FIGS. 4*a*, 4*b*, 4*c*, and 4*d* show the different displacements used for different shades;

FIGS. 5*a*, 5*b*, 5*c*, and 5*d* illustrate illustrates displaced partial secondary patterns corresponding to FIGS. 4*a*, 4*b*, 4*c*, and 4*d;*

DESCRIPTION OF THE PREFERRED EMBODIMENTS

Figure 1:
FIG. 1 is an original image of the example of the second preferred embodiment.

In each of the preferred embodiments the method is used to produce a primary pattern in which a latent image is encoded. The primary pattern in each case is produced by modification of a secondary pattern in accordance with a relationship which is established between the secondary pattern and the latent image which is to be encoded. The secondary pattern is also known as a decoding screen. The latent image can subsequently be viewed by overlaying the primary pattern with the secondary pattern. If more than one latent image is encoded, this forms a composite primary pattern.

Gray-Scale Embodiments

In the first and second preferred embodiments, the method is used to encode gray-scale images. In these embodiments, the set of values of the visual characteristic which is used as the basis of determining which displacement are to be applied to the secondary pattern is a set of different shades of gray.

In the first and second preferred embodiments the image elements are pixels. Herein, the term "pixel" is used to refer to the smallest picture element that can be produced by the selected reproduction process—e.g. display screen, printer etc.

In these embodiments the secondary pattern consists of rectangular groups of pixels arranged in such a way that if the secondary pattern is superimposed on itself with a certain displacement it eclipses it's own image (to the extent that the secondary pattern and the superimposed secondary pattern overlap). Each pixel in a group is either pure opaque (black) or pure transparent (white). The opaque and transparent groups alternate along at least one co-ordinate with at least approximate regularity. These groups will be referred to as "super pixels". Typically, the secondary pattern will be a rectangular array of pixels. However, the secondary pattern may have a desired shape—e.g. the secondary pattern may be star-shaped.

A typical secondary pattern for use in encoding a gray-scale latent image consists of a plurality of pure opaque vertical lines, each line being N pixels wide and separated by pure transparent lines of the same size. Such a secondary pattern can be used to encode a latent image having up to N+1 different gray-scale values.

In each of these embodiments, the latent image is formed from an original image. In gray-scale embodiments, the original image is typically a picture consisting of an array of pixels of differing shades of gray. However, the original image may be a colour image which is subjected to image processing to form a gray-scale image before subsequently being turned into a latent image. The original image is observed, in a simplified form, as the latent image when the secondary pattern and the primary pattern are overlaid.

In the gray-scale embodiments the latent image is a picture consisting of rectangular blocks of pixels. Each block consists of pixels with the same shade of gray. The number of shades of gray which can be used in different blocks are those required to display the latent image. The shades used in the latent image are a reduced set of the shades in the original image. The shades can be chosen in a number of different ways and might range from pure white to pure black. The blocks of pixels in the latent image do not have to be the same size as the super pixels, however, in many embodiments they will be the same size.

The maximum number of shades ($N_S$) which can be used in the latent image is controlled by the resolution of the reproduction technique and the preferred size of groups of pixels in the secondary pattern. The number of encoded shades cannot exceed: $N_S$=(1+the number of pixels in a super pixel of the Secondary Pattern)

In the first preferred embodiment, the secondary pattern is chosen to be a rectangular array (or matrix) of pixels. After a suitable secondary pattern is chosen, the secondary pattern is mathematically converted to a primary pattern as follows:

1. The total number of possible shades ($N_S$) is determined and selected from the composition of the secondary pattern (i.e. the maximum number of shades which the chosen secondary pattern is capable of encoding). Using standard image processing techniques known to persons skilled in the art, an original image is processed and digitised into an image containing $N_S$ different shades of gray. This image is the latent image.

2. Each pixel in the latent image is assigned a unique address (p,q) according to its position in the [p×q] matrix of pixels. (If the latent image or the secondary pattern is not a rectangular array then the position of pixels can be defined relative to an arbitrary origin, preferably one which gives positive values for both co-ordinates p and q).

3. Each shade of gray in the latent image is designated $S_m$, where $S_1$ is the palest shade of gray and $S_{NS}$ is the darkest shade of gray (m=an integer between 1 and $N_S$).

4. Each pixel in the latent image is designated as belonging to one of $S_1$-$S_{NS}$.

5. Each pixel in the secondary pattern is assigned a similarly unique address (p,q) according to its position in the [p×q] matrix.

6. The $S_1$-$S_{NS}$ designation of each (p,q) pixel in the latent image is now assigned to the corresponding (p,q) pixel in the secondary pattern to thereby relate pixels in the latent image to pixels in the secondary pattern.

7. A mathematical operation is performed on each individual pixel in the secondary pattern to move it along one of the image axes according to the shade of gray ($S_m$) assigned to it. This movement may be either right or left, or up or down, or combinations of movements along both of the axes simultaneously. A variety of displacements can be employed. In a common embodiment, each pixel is displaced as follows:

by 1 pixel for $S_1$ by $N_S$ pixels for $S_{NS}$ or, in general, by m pixels for $S_m$ Alternatively, a formula such as the following can be used:

$$D=(N_S-1)\times[(S-S_{min})/(S_{min}-S_{min})]$$

where D=the displacement (i.e. the number of pixels to be moved)

Direct assignment of equally spaced D values to particular shades via a table is also valid method.

The pairing of darkest shade with highest shift can also be reversed i.e. lightest shade with highest shift will provide a similar result.

The formulae shown above provide a broad contrast range and hence make the latent image relatively easy to see when the secondary pattern overlays the primary pattern. Other formulae will be appropriate in other applications.

The resulting image is known as the primary pattern. In the primary pattern, pixels of the secondary pattern have been displaced in accordance with the shade of gray of the pixel of the latent image with which they are related.

In the second preferred embodiment, once an appropriate secondary pattern has been chosen, the secondary pattern is manually converted (e.g. by a person manually operating a computer running appropriate software) to the primary pattern as follows:

1. The total number of possible shades ($N_S$) is determined and selected from the composition of the secondary pattern.

2. Using standard image processing techniques known to persons skilled in the art, an original image is processed and digitised into an image containing $N_S$ different shades of gray. This image is the latent image.

3. The latent image is then separated into $N_S$ masks where each mask contains only the pixels belonging to one shade of gray (i.e. belonging to $S_1$-$S_{NS}$). This is achieved using standard methods in commercially available imaging programs. After the masks have been formed each mask contains a unique set of pixels from the latent image and every pixel of the latent image can be found in only one of the masks. If all of the masks are combined correctly, the original picture can be restored.

4. A displaced partial secondary pattern is created for each mask, with the displacement of each partial secondary pattern corresponding to the shade of the pixels of the latent image to which the mask relates. These displaced partial secondary patterns are designated $S^*_1$-$S^*_{NS}$. This displacement may be either right or left, or up or down, or combinations of movements along both of the axes simultaneously. The displacement is defined by a mathematical operation (algorithm) performed on each individual pixel $S_1$-$S_{NS}$. The displacement is different for each $S_1$-$S_{NS}$. A variety of displacements can be employed. In a common embodiment, each pixel is displaced as follows:

by 1 pixel for $S^*_1$ by $N_S$ pixels for $S^*_{NS}$ or, in general, by m pixels for $S^*_m$ Alternatively, formulas such as the following can be used:

$$D=(N_S-1)\times[(S-S^*_{min})/(S^*_{NS}-S^*_{min})]$$

where D=the displacement (i.e. the number of pixels to be moved)

Direct assignment of equally spaced D values to particular shades via a table is also valid method.

The pairing of darkest shade with highest shift can also be reversed—i.e. lightest shade with highest shift will provide a similar result.

The formulae shown above provide a broad contrast range. Other formulae will be appropriate in other applications.

5. The masks are used to cut-out sections of the corresponding displaced partial secondary patterns, thereby relating the pixels of the latent image to the partial secondary patterns. The resulting $N_S$ masked partial secondary patterns images are each portions of the displaced secondary pattern.

6. The masked partial secondary patterns are now recombined into the primary pattern. The primary pattern is thus, a displaced version of the secondary pattern, where the displacement of individual pixels in the secondary pattern is based on a relationship established between pixels in the latent image and pixels in the secondary pattern.

Colour Embodiments

The methods of the third and fourth preferred embodiments are suitable for producing colour effects in encoded colour images. In the third and fourth embodiments, saturation level is the visual characteristic which is used as the basis for encoding the image. As in the first and second embodiments the image elements are pixels.

The secondary pattern of the third and fourth embodiments is best explained with reference to the black and white (B&W) secondary pattern of the first and second embodiments. A colour secondary pattern can be derived from a B&W secondary pattern by substituting pixels of the chosen secondary hues for the black groups of pixels in a B&W secondary pattern in a regular fashion so that the secondary pattern has a regular pattern of secondary hues. These regular patterns may involve changing the hue of each succeeding pixel or multiple of pixels in a regular and repeating fashion. The saturation levels of these secondary hues are determined as the maximum saturation levels found in the latent image. The transparent (white) areas may be filled with black or left white dependant on the requirements of the colour separation technique.

In these embodiments, secondary hues are colours that can be separated from a colour original image by various means known to those familiar with the art. A secondary hue in combination with other secondary hues at particular saturations (intensities) provides the perception of a greater range of colours as may be required for the depiction of the subject image. Examples of secondary hues are red, green and blue in the RGB colour scheme. Another colour scheme which may be used to provide the secondary hues is CYMK.

In these embodiments, saturation is the level of intensity of a particular secondary hue within individual pixels of the original image. Colourless is the lowest saturation available; the highest corresponds to the maximum intensity at which the secondary hue can be reproduced. saturation can be expressed as a fraction (i.e. colourless=0 and maximum hue=1) or a percentage (i.e. colourless=0% and maximum hue=100%) or by any other standard values used by practitioners of the art.

As in the first and second embodiments, the latent image will typically be provided by forming it from an original image. Typically, the original image will be a picture consisting of an array of pixels of secondary hues with differing saturations of each secondary hue. The original image is observed, in a simplified form, as the latent image when the secondary pattern and the primary pattern are overlaid. The latent image is a digitised and pixilated version of the original image.

The maximum number of saturation levels ($N_S$) of a particular secondary hue which can be visible in the Latent Image is controlled by the resolution of the reproduction technique and the preferred size of groups of pixels in the secondary pattern. The number of encoded saturation levels cannot exceed: $N_S$=(1+the number of pixels in a super pixel of the secondary pattern)

The methods of the third and fourth embodiments are also controlled by the number of secondary hues ($N_H$) used in the colour separation technique.

In the third embodiment, once a suitable secondary pattern has been chosen, the following steps are undertaken in the mathematical conversion of the Secondary Pattern to the Primary Pattern:

1. The total number of possible saturation levels ($N_S$) is determined and selected from the composition of the secondary pattern.

2. Using standard image processing algorithms known to persons skilled in the art, an original image is processed and digitised to the latent image, which is made to contain a maximum of $N_S$ saturation levels in each one of the hues.

3. Each pixel in the latent image is analysed sequentially to determine the saturation of the secondary hue in the pixel.

4. Each pixel in the latent image is allocated a unique address [(p,q)nh] according to its position in the [p×q] matrix and its hue, nh (nh=1 for hue number 1, nh=2 for hue number 2, . . . nh=$N_H$ for hue number $N_H$). Again, as in the first preferred embodiment the co-ordinates may be defined relative to a reference point rather than as positions in a matrix, especially where the latent image is not a rectangular array of pixels.

5. Each saturation level in the latent image is designated $S_m$, where $S_1$ is the lowest saturation and $S_{NS}$ is the most intense saturation (m=an integer between 1 and $N_S$). The secondary hue in each pixel of the latent image is designated as belonging to one of $S_1$-$S_{NS}$, and the pixel is addressed accordingly, [(p,q)nh,$S_m$].

6. Each pixel in the secondary pattern has a similarly unique address [(p,q)nh,ns] according to its position in the [p×q] matrix, its hue, and its saturation. The secondary pattern is now divided into X blocks of pixels (X=an integral number), each of which represents the smallest possible repeating unit in the secondary pattern. The addresses of the pixels in each block are modified to indicate their block number, x, as follows [(p,q)nh,NS,x] (x=an integral number between 1 and X)

7. Pixels [(p,q)nh,$S_m$] in the latent image are now assigned a block number, x, equal to the block number of the pixel having the same values of p and q in the secondary pattern, without regard for the respective values of nh and $S_m$. Pixels in the latent image now have an address [(p,q)nh,$S_m$,x] in which the value of x corresponds to that of the pixel having the same values of p and q in the secondary pattern. Thus, pixels of the latent image have been related to pixels of the secondary pattern.

8. Using the latent image, the average saturation $S_m^{av}$ is now calculated for each hue nh for all of the pixels in each block, x. Each block is consequently assigned a descriptor $\{S_m^1, S_m^2, \ldots S_m^{nh}\}$x to describe the average saturation, $S_m$, for each hue nh in each block x. The average saturation can only take one of the available saturation levels. $S_m$ is the value of saturation which is subsequently used to determine how pixels in the secondary pattern are displaced.

9. In each corresponding block x in the Secondary Pattern, pixels of each hue nh are now displaced along one of the image axes according to the saturation level of the hue ($S_m$) in the descriptor for that block, $\{S_m^1, S_m^2, \ldots S_m^{nh}\}$x. This movement may be either along one axis or another, or combinations of movements along both of the axes simultaneously. As in the previous embodiments, a variety of displacements can be employed. In a common embodiment, each pixel is displaced as follows:

by 1 pixel for $S_1$ by $N_S$ pixels for $S_{NS}$ or, in general, by m pixels for $S_m$ Alternatively, a formula such as the following can be used:

$$D=(N_S-1)\times[(S-S_{min})/(S_{max}-S_{min})]$$

where D=the displacement (i.e. the number of pixels to be moved)

Direct assignment of equally spaced D values to particular saturation levels via a table is also a valid method.

The pairing of the most intense saturation with highest shift can also be reversed i.e. lightest saturation with highest shift will provide a similar result.

The formulae shown above provide a broad contrast range. Other formulae will be appropriate in other applications.

The resulting image is the primary pattern and is, in effect, a displaced version of the secondary pattern, where the displacement is dependent on the relationship established between pixels of the latent image and pixels of the secondary pattern.

In the fourth embodiment, a suitable secondary pattern is chosen and then the following steps are undertaken in the manual conversion of the secondary pattern to the primary pattern:

1. The total number of possible saturation levels ($N_S$) is determined and selected from the composition of the secondary pattern.

2. Using standard image processing techniques, an original image is processed and digitised in order to provide the latent image.

3. The latent image is then colour separated into a number of hue images representing each of the secondary hues, using standard image processing techniques. Each hue image is a gray-scale picture produced as a colour separation from the original image, wherein the shade of gray represents a particular saturation of the particular hue.

4. Each hue image is analysed to determine the highest saturation level of each secondary hue. These values are subsequently used to define the secondary hue saturation levels used later to produce displaced partial secondary patterns as discussed in further detail below.

5. Using standard image processing techniques, the dynamic range of each hue image is expanded to the maximum available (the limit may vary depending on the software being used), the dynamic range is then reduced to $N_S$ saturation levels, before the dynamic range is expanded again.

6. Each hue image is now separated into $N_S$ masks, each containing only the pixels belonging to one hue (i.e. belonging to $S^*_1$-$S^*_{NS}$) using standard methods in commercially available imaging programs such as Photoshop (available from Adobe Systems Incorporated, www.adobe.com). Each mask contains a unique set of pixels from the image and every pixel can be found in only one of the masks. If all of the masks from one secondary hue set are combined at their correct saturation levels, the original hue image is restored.

7. $N_H$ partial secondary patterns are created by colour separation of the secondary pattern, each of these partial secondary patterns only contains a single secondary hue.

8. A displaced partial secondary pattern is created for each mask corresponding to it's hue and saturation. The saturation levels are designated $S^*_1$-$S^*_{NS}$. The displacement may be either right or left, or up or down, or combinations of movements along both of the axes simultaneously. The displacement is defined by a mathematical operation (algorithm) performed on each individual pixel $S^*_1$-$S^*_{NS}$. The displacement is different for each $S^*_1$-$S^*_{NS}$. A variety of displacements can be employed. In a common embodiment, each pixel is displaced as follows:

by 1 pixel for $S^*_1$
by $N_S$ pixels for $S^*_{NS}$
or, in general,
by m pixels for $S^*_m$ Alternatively, a formulas such as the following can be used:

$$D=(N_S-1)\times[(S-S^*_{min})/(S^*_{NS}-S^*_{min})]$$

where D=the displacement (i.e. the number of pixels to be moved)

Direct assignment of equally spaced D values to particular saturation levels via a table is also valid method.

The pairing of most intense saturation with highest shift can also be reversed i.e. lightest saturation with highest shift will provide a similar result.

The formulae shown above provide a broad contrast range. Other formulae will be appropriate in other applications.

9. The masks are used to cut-out sections of the corresponding displaced partial secondary patterns, thereby relating pixels of the latent image to pixels of the partial secondary patterns. The resulting $N_S \times N_H$ displaced partial secondary patterns are each assemblies of portions of the corresponding, shifted secondary pattern.

10. The displaced partial secondary patterns are now recombined to form the primary pattern which is a displaced version of the secondary pattern where the displacement is based on the saturation levels of the latent image pixels with which a relationship has been established.

Alternative Embodiments

A number of variations may be made to the foregoing embodiments of the invention, for example, while the image elements are typically pixels the image elements may be larger than pixels in some embodiments—e.g. each image element might consist of 4 pixels in a 2×2 array.

In some embodiments, once the primary pattern has been formed, a portion (or portions) of the primary pattern may be exchanged with a corresponding portion (or portions) of the secondary pattern to make the latent image more difficult to discern.

Further security enhancements may include using colour inks which are only available to the producers of genuine bank notes, the use of fluorescent inks or embedding the images within patterned grids or shapes.

The method of at least the first and second preferred embodiments may be used to encode two or more latent images within one primary pattern. For example, with one primary pattern providing the secondary pattern for the other primary pattern and vice versa. This is achieved by forming two primary patterns using the method described above. The primary patterns are then combined at an angle which may be 90 degrees (which provides the greatest contrast) or some smaller angle. The primary patterns are combined into a composite primary pattern by overlaying them at the desired angle and then keeping either the darkest of the overlapping pixels or the lightest of the overlapping pixels, depending on the desired level of contrast.

It is possible, to combine 3, 4, 5 or more latent images into a single composite primary pattern using digital techniques. When combining multiple latent images, there are a number of techniques which may be employed to improve the quality and/or security of the composite primary pattern. The techniques employed will depend on the nature of the latent images, the number of images, and whether the same or different secondary patterns are to be used to decode the primary pattern.

Intersections of the primary patterns in a composite primary pattern can be handled in a number of ways: for example logic operations such as AND, OR or XOR, or subtraction and addition to precise thresholds can be performed. Moreover these techniques can be individually applied to just the intersections or even to intersections from particular primary patterns in the composite primary pattern. This allows image discernment to be optimised for particular latent images and applications.

The goal of such processes is to combine the pixels at the intersection in order to provide the greatest contrast in competition with the greatest concealment. The ability to make such modifications is a significant advantage of the digital techniques of embodiments of the invention.

When combining two or more primary patterns, it is possible to use secondary patterns (hereunder referred to as "screens") of different width or frequency. For example, a first screen which is four pixels wide and a second screen which is five pixels wide so that two different secondary patterns are needed in order to decode the two different primary patterns encoded within a single composite primary pattern. This has a benefit of added security—i.e. if the first screen is compromised, the image encoded by the second screen may still be secure. Further, using different screens increases contrast between the different primary patterns in the composite primary pattern so that they be more readily decoded from one another. This principle may be extended to cases where three or more images are encoded within the same composite primary pattern.

When two or more primary patterns are combined at angles other than 90 degrees the primary patterns themselves will interact, at the very least this interaction will manifest itself as a Moiré pattern. In more extreme cases partial decoding of the images can occur, when this occurs in a single device it is referred to as self-decoding.

For example, when three primary patterns are combined into a single primary pattern, not all the primary patterns can be combined at 90 degrees. Another problem is that the intersections of the first two primary patterns create a fixed screen such that the third primary pattern will have a phase position with respect to these intersections. To get around this problem the angles should be chosen to avoid Moirés and self decoding.

A contributing factor to the selection of optimum screen angles is defined by the width of the lines. If two screens (secondary patterns) cross at right angles, the obvious third angle for a third screen would be 45 degrees but this is only true if the lines are the same widths. Consider that if the screen lines are of different widths (so that separate screens are needed to reveal each image and not just a trivial rotation), then the right angle intersection is a rectangle not a square and the diagonal of the rectangle will be some other angle other than 45 degrees. Good contrast is achieved when the angle of the third image is the same is the angle of the longest diagonal of the parallelograms produced at the intersection of the first two sets of lines regardless of the first angle.

This means the third primary pattern mostly inhabits the "white space" left by the first two images. However, this may result in self-decoding. To avoid self-decoding the angles may be varied by 5 to 10 degrees—i.e. to reduce the amount of self-decoding while maintaining relatively high contrast.

Figure 17:
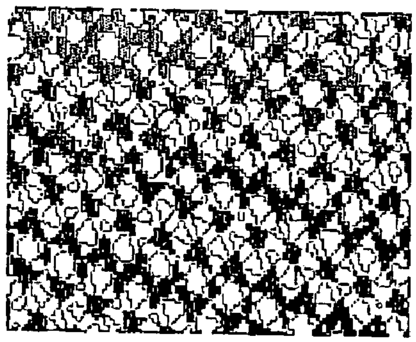
FIG. 17 illustrates an eight shade primary pattern.

Other techniques may be used to combine primary patterns. Using a triple composite primary pattern as an example, there is only a range of 256 shades with the conventional 8 bit grey scale image. If each primary pattern has the value as 0 and 255 (black and white) then when these values can be summed by simple addition, the range of shades would be from 0 to 765 with three images. This is not processable by standard image processing software packages. However, by compressing the range of values of the primary patterns to 0 to 85 then the summed triple primary pattern would consist of the four shades 0, 85, 170, 255. An exemplary combined triple primary pattern of this type is shown in FIG. 17.

If such a device were to be offset printed, this would require 4 inks and 4 printing plates, and registration of the four plates would have to be perfect, so this is very difficult to print.

Figure 18:
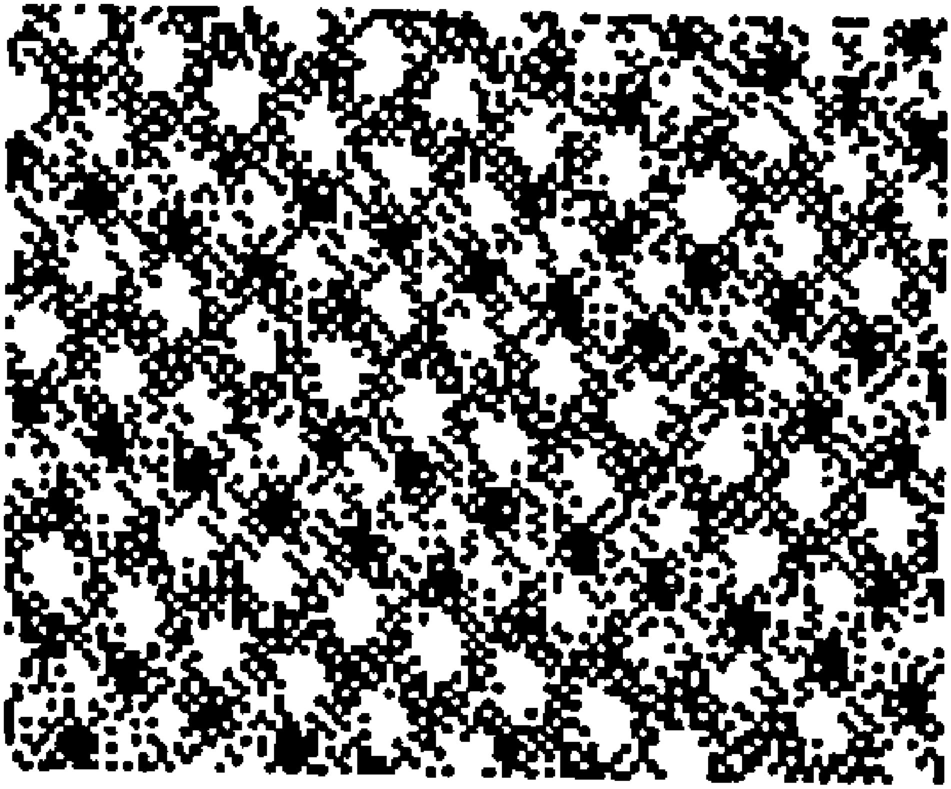
FIG. 18 is FIG. 17 dithered to reduce the shades to black and white.

However, the image can be reduced to black and white using a standard Floyd-Steinburg dither giving the printable black and white primary pattern shown in FIG. 18.

Persons skilled in the art would also appreciate that a dithering program could be coded to process 0 to 765 values to produce black and white image elements.

A primary pattern gives the highest security against counterfeiting when it pushes the limits of the current printing technology; that is, it utilises the highest resolution possible.

If the number of shades encoded (S) is chosen to be:

$$S=(WR/(25.4X))+1$$

Where:

S=the number of shades;

W is the intended width of the printed primary pattern;

R is the printer resolution in DPI; and

X is the digital primary pattern width in pixels.

A counterfeiter must match or exceed the resolution in order to copy the primary pattern.

Persons skilled in the art will appreciate that primary pattern can be positives or negatives—i.e. black and white lines look the same as white and black. However, when two or more are combined, a negative may provide better contrast. Consider the positive and negative of two primary patterns added at right angles:

A dual 90 degree primary pattern will be 75% black and 25% white and the negative will be 75% white and 25% black.

As more primary patterns are added the combination will become increasingly dark (if you are summing the black component). As a result the negative will become increasingly light.

Accordingly, depending on the nature of the latent images it may be advisable to take various combinations of positive and negative at particular times in the combination process. For example, after combining the first two primary patterns of a triple primary pattern, taking the negative before adding the third.

There are several advantages of this process:

(a) It makes the primary pattern more complicated and harder to copy.

(b) It is possible to generate a range of tones that can help fit the primary pattern into an existing image.

(c) It is possible to improve image contrast.

In one embodiment, the primary pattern and secondary pattern are sized so that the elements making up the primary patterns and secondary pattern are smaller than the wavelength of visible light and not visible until they interact.

Suitable techniques for producing such primary and secondary patterns include UV laser lithography and electron beam technology.

Figure 16:
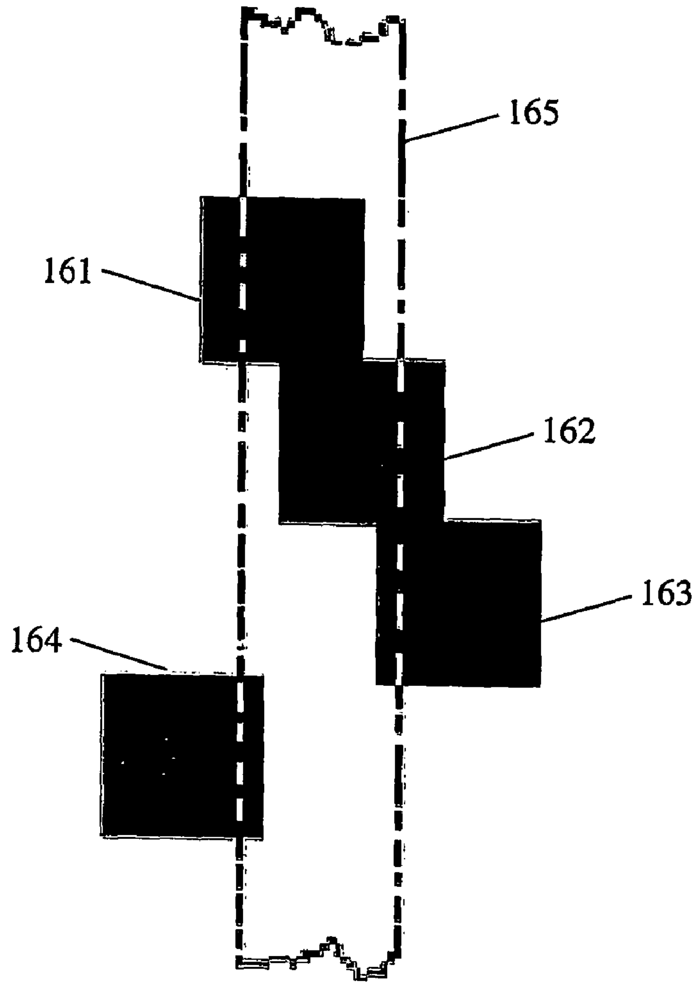
FIG. 16 illustrates left and right phase shifts.

As discussed above, phase movements can be to the right or left. In the preferred embodiment, the convention of displacements to the right is only a convention; the element could be moved left with equal effectiveness. This is illustrated in FIG. 16.

Here elements 161,164 are moved to the Left and elements 162,163 are moved to the Right but elements 161,162 decode as the same shade and elements 163,164 decode as the same shade. The dotted outline 165 shows the position of the decoding screen when the correct image is displayed.

Provided care is taken to avoid collisions between right and left moving elements these both could be combined within one encoded image. One way to avoid collisions is to separate right and left movements in phase to different horizontal rows of elements. These right and left moving rows do not have to alternate or follow any regular pattern and could form part of an overall algorithm to generate a unique screen.

An advantage of using combinations of right and left phase shifts is to reduce the "Medallion" or embossed effects which might otherwise be apparent. This embossed effect may otherwise permit visualisation of particular primary patterns without decoding. So the use of right and left movement significantly improves concealment.

While the above discussion of left and right phase shifts is constrained to a device utilising a decoding screen composed of vertical lines, the same considerations apply to horizontal lines or any angle. If the elements were composed of dots they could be moved in any and every direction only to the extent that movement is required to impart the correct shade. Similarly, the shifts could be up and down.

The primary patterns need not necessarily be printed. In one embodiment, an embossed microstructure may be produced using a combination of electron beam and photolithography. For example for use as part of polymer banknotes. Typically, The primary pattern will consist of an embossed set of 30 micron×30 micron pixels, wherein each pixel consists of several sub-pixel areas (e.g. 3 or 4) and the position (i.e. displacement) of the sub-pixel areas within each pixel in the primary pattern is the means by which image information is encoded. The sub-pixel block areas on the embossing dye will be of height 20-30 microns and because of this relatively large height, will be able to be directly embossed into a polymer substrate. In this embodiment, the secondary pattern is also an embossed microstructure and the readout of the latent image information takes place via the refractive moiré interference between the two embossed areas.

Application of the Preferred Embodiments

The method of preferred embodiments of the present invention can be used to produce security devices to thereby increase security in anti-counterfeiting capabilities of items such as tickets, passports, licences, currency, and postal media. Other useful applications may include credit cards, photo identification cards, tickets, negotiable instruments, bank cheques, traveller's cheques, labels for clothing, drugs, alcohol, video tapes or the like, birth certificates, vehicle registration cards, land deed titles and visas.

Typically, the security device will be provided by embedding the primary pattern within one of the foregoing documents or instruments and separately providing a decoding screen in the form which includes the secondary pattern. However, the secondary pattern could be carried by one end of a bank note while the primary pattern is carried by the other end to allow for verification that the note is not counterfeit.

Persons skilled in the art will appreciate that the above embodiments describe a digital latent image technique based on selective displacements of elements of a decoding screen. The various embodiments allow a great deal of flexibility in encoding the latent image, e.g. the primary patterns or composite primary patterns can be modified, or produced, so as to improve concealment or latent image contrast. For example, digital techniques allow displacements in irregular directions (e.g. left in one case and right in the next). This allows for better concealment of the latent image. Similarly, the pairing of darkest shade with highest shift can be reversed (i.e. lightest shade with highest shift will provide a similar result) or made irregular where this is desirable. Indeed, the displacement algorithm can be one of a wide range of possible formulae. The formulae can, for example, be used to optimise the contrast range and hence make the latent image more easily seen when the secondary pattern overlays the primary pattern. Other formulae will be appropriate in other applications.

Example

In this example, a primary pattern is formed using the method of the second preferred embodiment.

FIG. 1 is an example of an original image. The original image was of fairly low resolution (104 by 147 pixels) and was a 256-colour image although it is shown in black and white for the sake of convenience.

Figure 2:
FIG. 2 is a latent image of the example of FIG. 1.

The colour image of FIG. 1 was then reduced to a grayscale picture and the shades of gray were then equalised to provide the greatest shade separation. The image was then reduced to four shades of gray using the optimised median cut method with aero diffusion. The result is illustrated in FIG. 2.

In terms of the 8 bit RGB colour scale the shades in this picture consisted of [228R/228G/228B], [164/R.164G.164/B], [98/R/98G/98B] and [28R/28G/28B]. Further equalisation was thought to be unnecessary as the full shade range from phase modulation would only be from 50 to 100% black with losses due to the use of transparent media.

This image was separated into masks representing the required shades. (Note that the lightest shade [228R/228G/228B] will serve as a background and therefore does not need a mask).

Figures 3A, 3B, 3C:
FIGS. 3*a*, 3*b*, and 3*c* are masks which are used in the example of FIG. 1.

FIG. 3*a* is the mask for shade 28. FIG. 3*b* is the mask for shade 98. FIG. 3*c* is the mask for shade 164. These masks are positive masks as the black areas define the areas that will be filled with each shade.

A secondary pattern of black lines, three-printer pixels wide, and spaced apart by three-printer pixels is to be used. Considering the secondary pattern as a reference, the different shades are to be encoded using a phase shift of zero printer pixels for the lightest shade, one printer pixel for the 164 shade, 2 printer pixels for the 98 shade and 3 printer pixels for the 28 shade. This, of course, will not produce an exact match to the original shades but this will only affect the contrast and brightness of the final observed image.

The phase shifts are illustrated diagrammatically in FIG. 4, where FIG. 4*a* relates to shade 28, FIG. 4*b* relates to shade 98, FIG. 4*c* relates to shade 164, and FIG. 4*d* relates to shade 28. In each case the upper line relates to the secondary pattern and the lower line relates to the displaced secondary pattern (primary pattern).

A set of four displaced secondary patterns were prepared with the required phase difference as illustrated in FIG. 4. These are illustrated in FIGS. 5*a* to 5*d*. Where FIG. 5*a* relates to shade 28, FIG. 5*b* relates to shade 98, FIG. 5*c* relates to 164 and FIG. 5*d* relates to shade 228. These partial secondary patterns are 18 times the linear size of the original portrait masks. That is, 1872 by 2646. The three masks were also expanded from 104 by 147 pixels to 1872 times 2646 pixels. This expansion was to ensure that sufficient pixels were available to define the shades in the final image. In essence, each pixel in the original latent image was expanded to a superpixel of 18 by 18 pixels. Therefore it could be defined in shade by a pattern made up of lines composed of normal pixels.

Figure 6:
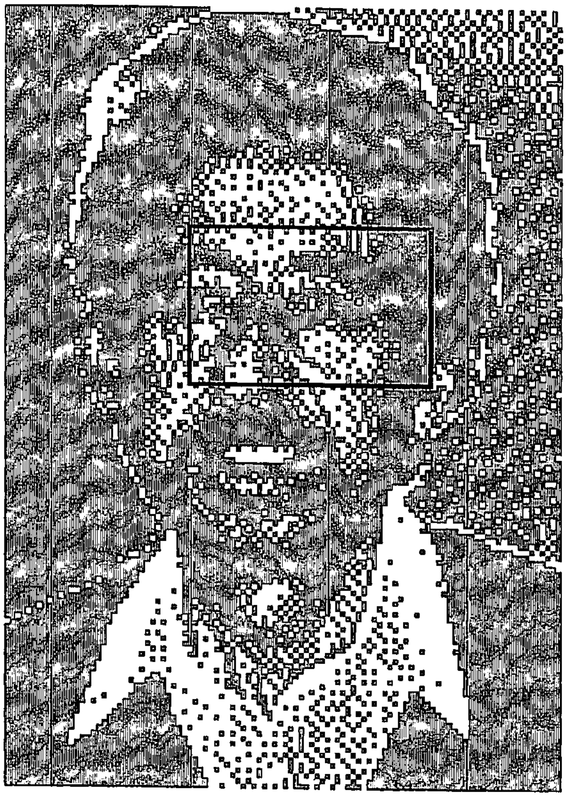
FIGS. 6 through 13 illustrate how the masked partial secondary patterns may be combined to form the latent image.
Figure 7:
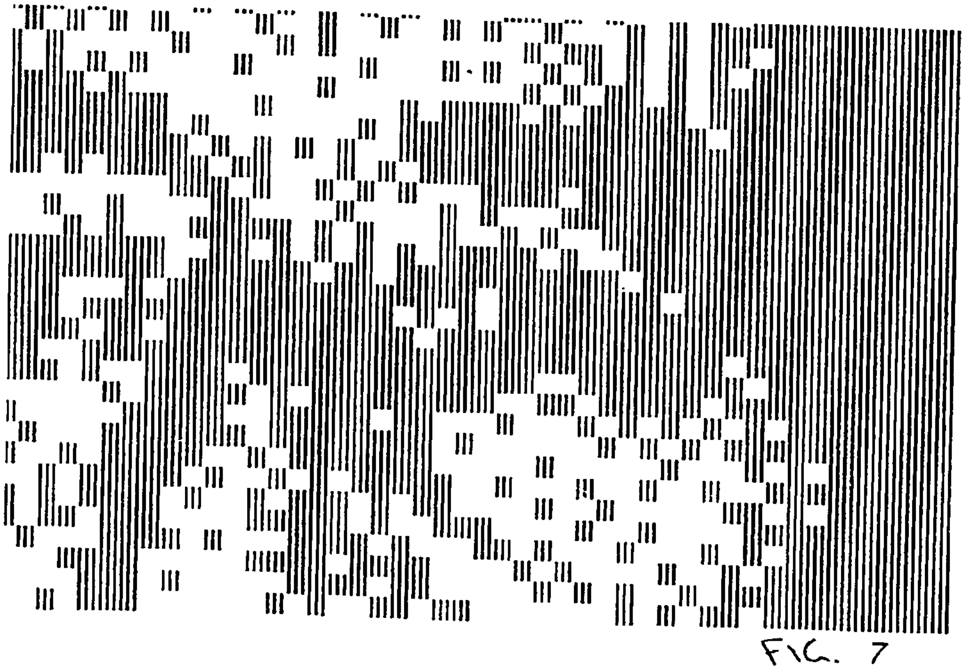

In order to combine the partial secondary patterns, the shade 228 image was used as the background and sections of it were replaced by the other shade images as follows:

Firstly the mask of the 164 shade was used to white out the required areas on the shade 228 image as illustrated in FIG. 6. FIG. 7 shows a detail of FIG. 6 corresponding to the boxed area.

Figure 8:
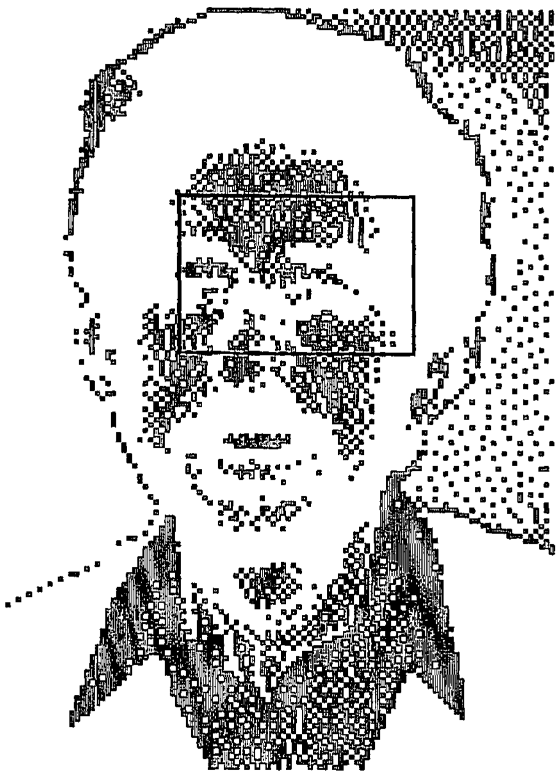
Figure 9:
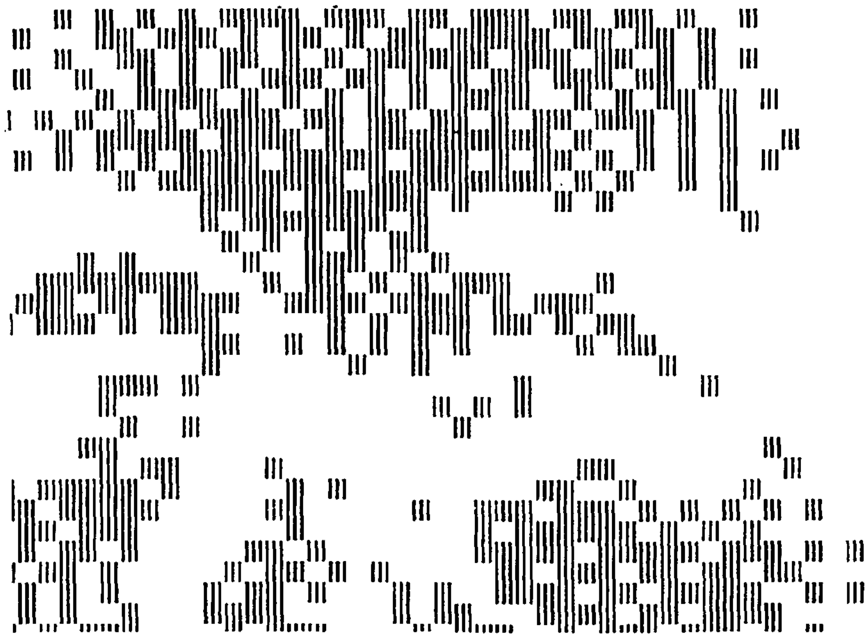

Next the mask for the 164 shade is used to mask out the 164 shade line image as shown in FIG. 8. Again a detail of the right eye (as indicated by the box in FIG. 8) is shown in FIG. 9. The image shown in FIG. 8 was added to the image of FIG. 6 to produce the image shown in FIG. 10. Again a close up of the right eye of FIG. 10 is shown in FIG. 11.

Figure 10:
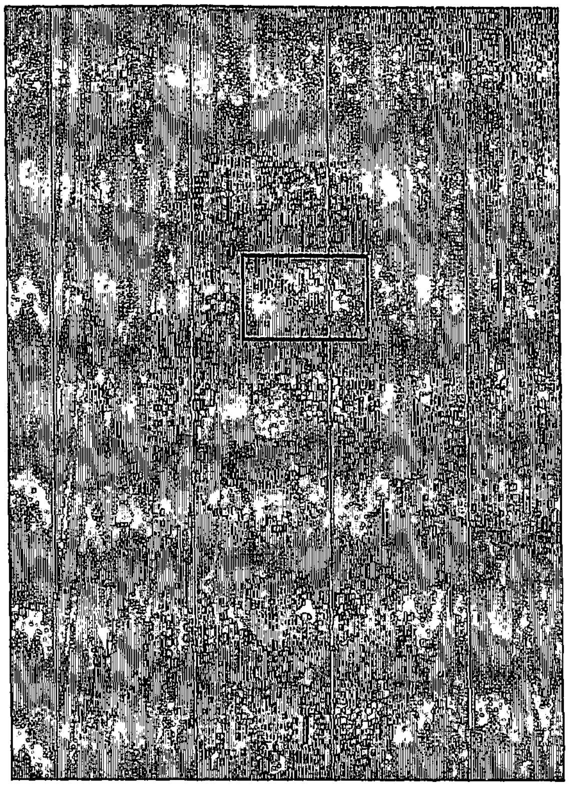
Figure 11:
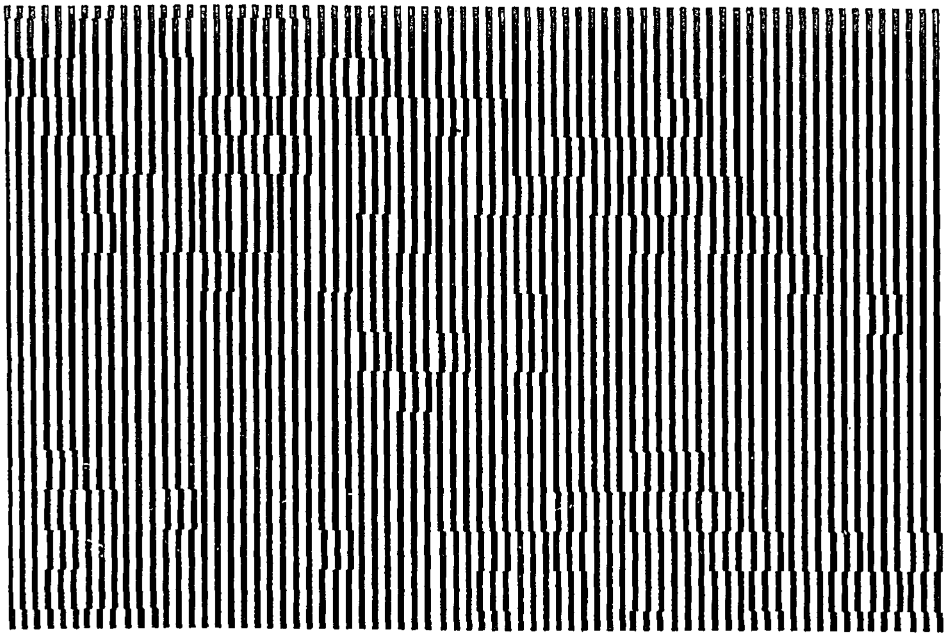

The process is repeated using the image produced in FIG. 10 for the addition of the shade 98 elements using the same procedure as used for shade 164.

Figure 12:
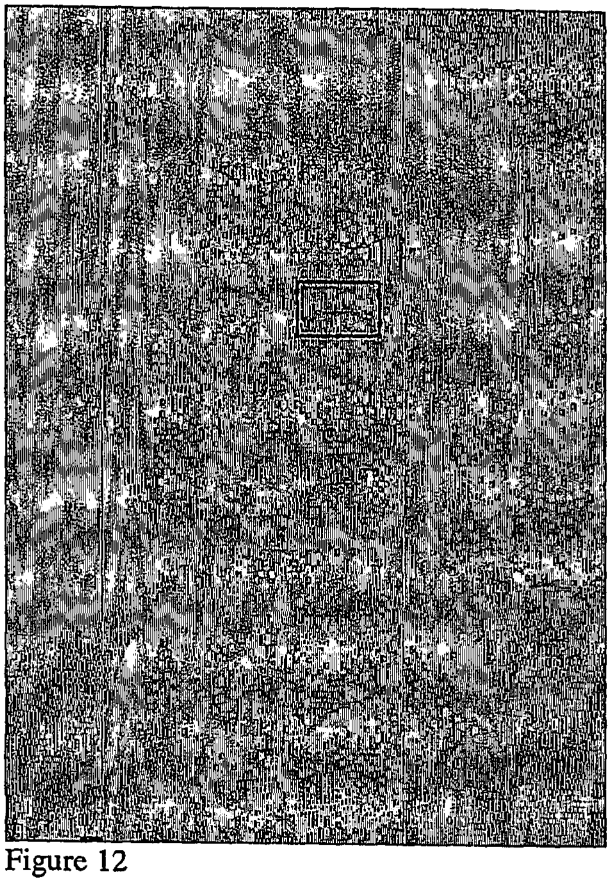

This is then repeated with shade 98 to produce the complete latent image shown in FIG. 12. Again detail of FIG. 12 is shown in FIG. 13.

Figure 13:
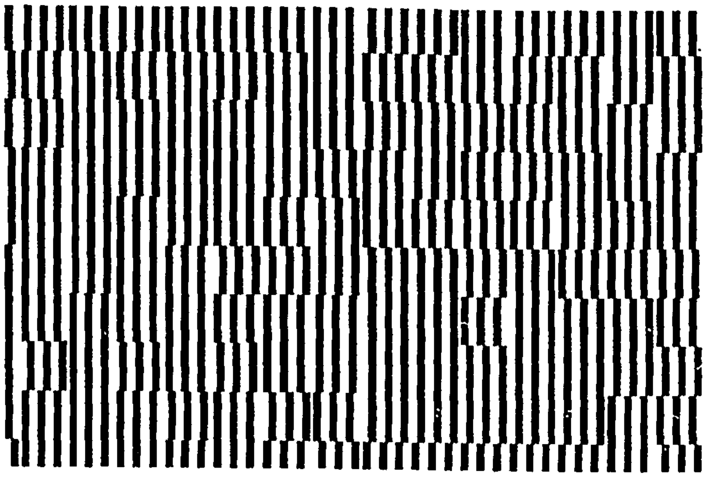
Figure 14:
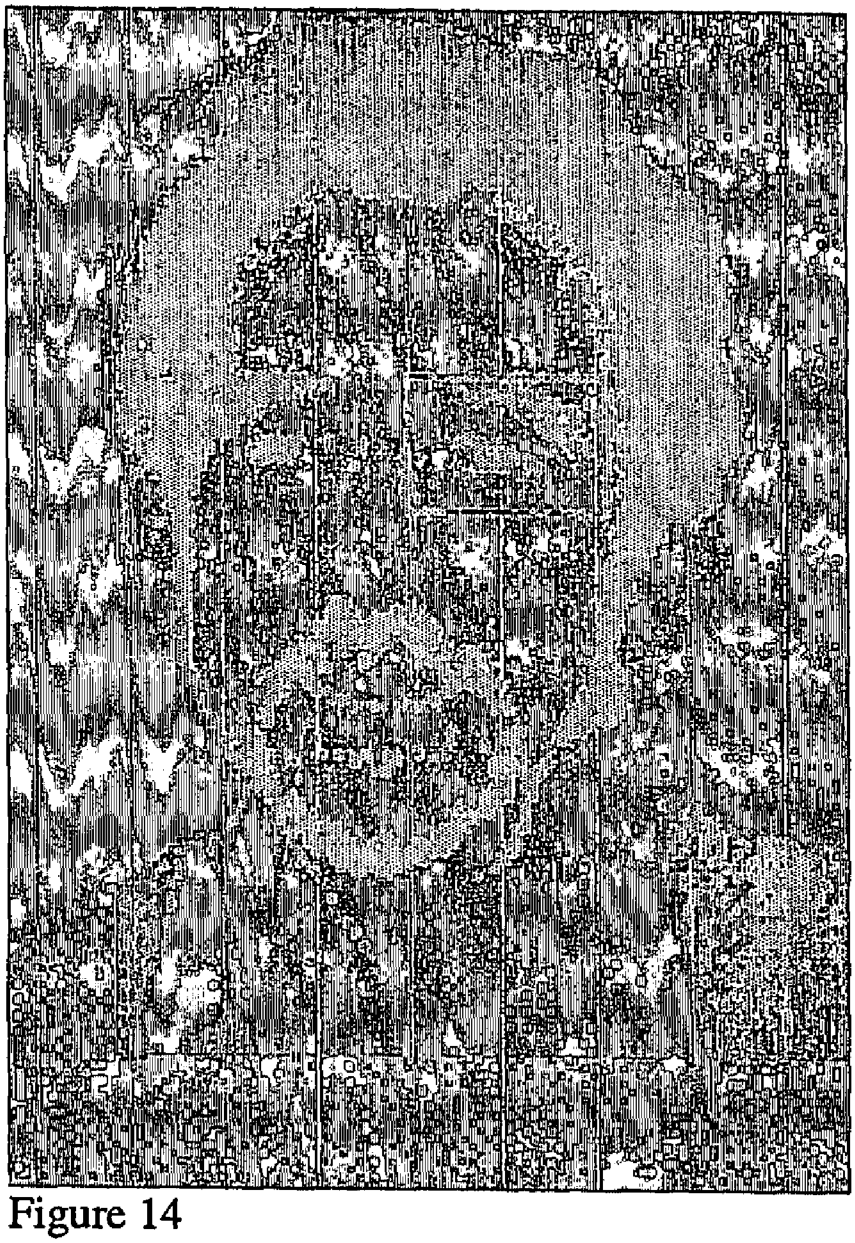
FIGS. 14 and 15 illustrate how the latent image may be retrieved using a decoding screen which comprises the secondary pattern.
Figure 15:
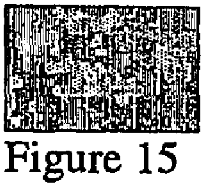

FIGS. 14 and 15 illustrate how, when the secondary pattern is overlaid on the image of FIGS. 12 and 13, the latent image reappears in a manner which approximates the original latent image.

Terminology in Provisional Application

In the specification of Australian provisional application 2003905861 from which this application claims priority, the term "primary pattern" was used to refer to the decoding screen and the term "secondary pattern" was used to refer to the encoded image. The reader will appreciate that these terms have been reversed in the present specification without altering the intended meaning. The terms have been reversed for consistency with other co-pending applications which reference the present application and its priority application.

The invention claimed is:

1. A method of encoding a latent image, the method comprising:

a) providing a latent image to be encoded, the latent image having a plurality of latent image elements, each latent image element having a visual characteristic which takes one of a predetermined set of values;

b) providing a secondary pattern having a plurality of secondary image elements, the secondary pattern being capable of decoding said latent image once the latent image has been encoded the secondary pattern comprising rectangular groups of image elements arranged in such a way that if the secondary pattern were superimposed upon itself at a certain displacement it would eclipse its own image;

c) relating the latent image elements to the secondary image elements; and d) forming a primary pattern comprising a plurality of primary image elements which correspond to said secondary image elements displaced in accordance with the value of the visual characteristic of the latent image elements to which said secondary image elements are related.

2. The method as claimed in claim 1 further comprising selecting said visual characteristics to be a set of gray-scale values.

3. The method as claimed in claim 1 further comprising selecting said visual characteristics to be saturation values of the hue of the latent image elements.

4. The method as claimed in claim 1 further comprising providing a secondary pattern comprising rectangular groups of image elements arranged in such a way that if the secondary pattern were superimposed upon itself at a certain displacement it would eclipse it's own image.

5. The method as claimed in claim 4, further comprising providing a secondary pattern comprising a rectangular array consisting of a plurality of opaque vertical lines, each line being N image elements wide and separated by transparent lines N image elements wide whereby said secondary pattern can be used to encode a latent image having up to N+1 different gray-scale values.

6. The method as claimed in claim 1 wherein said image elements are pixels.

7. The method as claimed in claim 6 wherein the number of visual characteristics is chosen on the basis of the printing technique to be used to print the primary pattern.

8. The method as claimed in claim 7, wherein the number of visual characteristics (S) is determined in accordance with the equation:

$$S=(WR/25.4X)+1, \text{ where:}$$

W is the to be printed width of the primary pattern;

R is the printer resolution in image dots per square inch; and

X is the width of the primary pattern in pixels.

9. The method as claimed in claim 1 wherein relating the latent image elements to the secondary image elements comprise associating the latent image elements with secondary image elements, where-after the secondary image elements are displaced in dependence on the value of the visual characteristic of the latent image elements with which they are associated.

10. The method as claimed in claim 1 wherein relating the latent image elements to the secondary image elements comprises separating the latent image into a plurality of masks corresponding to each value of the visual characteristic, forming a plurality of displaced partial secondary patterns, and using the masks to modify the plurality of displaced partial secondary patterns and combining the modified displaced partial patterns to form said primary pattern.

11. A method of encoding a latent image, the method comprising:

a) providing a latent image to be encoded, the latent image having a plurality of latent image elements, each latent image element having a visual characteristic which takes one of a predetermined set of values;

b) providing a secondary pattern having a plurality of secondary image elements, the secondary pattern being capable of decoding said latent image once the latent image has been encoded;

c) relating the latent image elements to the secondary image elements; and d) forming a primary pattern comprising a plurality of primary image elements which correspond to said secondary image elements displaced in accordance with the value of the visual characteristic of the latent image elements to which said secondary image elements are related, wherein said secondary and primary image elements are arranged in a generally rectangular array, said secondary image elements are displaced along an axis of the rectangular array and there are S different values of the visual characteristic, and wherein secondary image elements associated with latent image elements having a first value of the visual characteristic are displaced by 1 image element, and each subsequent visual characteristic is displaced by a further image element so that the Sth shade is displaced by S image elements.

12. The method as claimed in claim 11 wherein said secondary image elements are displaced along an axis of the rectangular array.

13. The method as claimed in claim 12 wherein said secondary image elements are displaced along an axis of the rectangular array and there are S different values of the visual characteristic, and wherein secondary image elements associated with latent image elements having a first value of the visual characteristic are displaced horizontally by 1 image element, and each subsequent visual characteristic is displaced by a further image element so that the Sth shade is displaced by S image elements.

14. The method as claimed in claim 12 wherein said secondary image elements are displaced along an axis of the array and there are S different values of the visual characteristic, and wherein secondary image elements associated with latent image elements having a first value of the visual characteristic are displaced in accordance with the equation:

$$\text{displacement } (D)=(N-1)*[(S-S_{min})/(S_N-S_{min})];$$

where S is the value of the visual characteristic being displaced, $S_{min}$ is the sparsest density value of the visual characteristic and $S_N$ is the densest value of the visual characteristic.

15. A method of encoding a latent image, the method comprising:

a) providing a latent image to be encoded by forming the latent image from an original image by image processing an original image to reduce the number of values of the visual characteristic in the original image to the number of values required in the latent image, the latent image having a plurality of latent image elements, each latent image element having a visual characteristic which takes one of a predetermined set of values;

b) providing a secondary pattern having a plurality of secondary image elements, the secondary pattern being capable of decoding said latent image once the latent image has been encoded;

c) relating the latent image elements to the secondary image elements; and d) forming a primary pattern comprising a plurality of primary image elements which correspond to said secondary image elements displaced in accordance with the value of the visual characteristic of the latent image elements to which said secondary image elements are related.

16. The method as claimed in claim 1 wherein displacing said secondary image elements comprises displacing image elements of different portions of said secondary pattern in different directions.

17. A method of encoding a plurality of latent images, the method comprising:

a) providing a plurality of latent images to be encoded, each latent image having a plurality of latent image elements, each latent image element having a visual characteristic which takes one of a predetermined set of values;

b) providing at least one secondary pattern, each at least one secondary pattern having a plurality of secondary image elements, each secondary pattern being capable of decoding one or more of said latent images once the latent images have been encoded;

c) relating the latent image elements to the secondary image elements of the secondary pattern which is to decode the latent image;

d) forming a primary pattern for each primary pattern comprising a plurality of primary image elements which correspond to said secondary image elements displaced in accordance with the value of the visual characteristic of the latent image elements to which said secondary image elements are related; and e) combining said primary patterns at angles to one another to form a composite primary pattern encoding each of said latent images.

18. The method as claimed in claim 17 wherein a single secondary pattern encodes all of the latent images.

19. The method as claimed in claim 17, wherein different secondary patterns are provided for each of said latent images.

20. The method as claimed in claim 19, wherein said different secondary patterns are configured to encode different numbers of visual characteristics and said latent images have different numbers of visual characteristic to one another.

21. The method as claimed in claim 17 wherein said primary patterns are combined to provide maximum contrast between said primary patterns.

22. The method as claimed in claim 17 wherein said primary patterns are combined to provide contrast between said primary patterns while avoiding self-decoding effects.

23. The method as claimed in claim 17 wherein said primary patters are combined at 5-10 degrees from the angle which provides maximum contrast between said primary pattern.

24. The method as claimed in claim 17 wherein there are two primary patterns combined at 90 degrees to one another.

25. The method as claimed in claim 17 where there are three primary patterns, and the angles between neighboring images is in the range of 35 to 55 degrees.

26. The method as claimed in claim 17 wherein one or more of said primary patterns is converted to a negative before said primary patterns are combined.

27. The method as claimed in claim 17 wherein where said primary patterns overlap, image elements are combined to select for a combination of contrast and concealment.

28. The method as claimed in claim 17, wherein said primary patterns are combined by summing together the visual characteristic of collocated image elements to obtain a combined primary pattern and dithering the combined primary pattern to obtain a black and white composite primary pattern.

29. An article of manufacture comprising a primary pattern encoding a latent image, said primary pattern comprising:

a plurality of primary image elements which can be decoded by a secondary pattern comprising a plurality of secondary image elements said secondary pattern comprises rectangular groups of the secondary image elements arranged in such a way that if the secondary pattern were superimposed upon itself at a certain displacement it would eclipse its own image, said primary image elements being displaced relative to respective ones of said secondary image elements, the displacement being determined on the basis of the value of the visual characteristic of latent image elements related to respective ones of said secondary image elements.

30. The article of manufacture as claimed in claim 29 wherein said visual characteristics are a set of gray-scale values.

31. The article of manufacture as claimed in claim 29 wherein said visual characteristics are saturation values of the hue of the latent image elements.

32. The article of manufacture as claimed in claim 29 wherein said secondary pattern comprises rectangular groups of image elements arranged in such a way that if the secondary pattern were superimposed upon itself at a certain displacement it would eclipse it's own image.

33. The article of manufacture as claimed in claim 29 wherein said secondary pattern comprising a rectangular array consisting of a plurality of opaque vertical lines, each line being N image elements wide and separated by transparent lines N image elements wide whereby said secondary pattern can be used to encode a latent image having up to N+1 different gray-scale values.

34. The article of manufacture as claimed in claim 29 wherein said image elements are pixels.

35. The article of manufacture as claimed in claim 34 wherein the number of visual characteristics (S) is determined in accordance with the equation:

$$S=(WR/25.4X)+1,$$ where:

W is the to be printed width of the primary pattern;

R is the printer resolution in pixels per square inch; and

X is the width of the primary pattern in pixels.

36. An article of manufacture comprising a primary pattern encoding a latent image, said primary pattern comprising:

a plurality of primary image elements which can be decoded by a secondary pattern comprising a plurality of secondary image elements, said primary image elements being displaced relative to respective ones of said secondary image elements, the displacement being determined on the basis of the value of the visual characteristic of latent image elements related to respective ones of said secondary image elements wherein said secondary and primary image elements are arranged in a generally rectangular array, said secondary image elements are displaced along an axis of the rectangular array, wherein there are S different values of the visual characteristic, and wherein secondary image elements associated with latent image elements having a first value of the visual characteristic are displaced by 1 image element, and each subsequent visual characteristic is displaced by a further image element so that the Sth shade is displaced by S image elements.

37. The article of manufacture as claimed in claim 36 wherein said secondary image elements are displaced along an axis of the rectangular array.

38. The article of manufacture as claimed in claim 29 wherein there are S different values of the visual characteristic, and wherein secondary image elements associated with latent image elements having a first value of the visual characteristic are displaced horizontally by 1 image element, and each subsequent visual characteristic is displaced by a further image element so that the Sth shade is displaced by S image elements.

39. The article of manufacture as claimed in claim 37 wherein said secondary image elements are displaced along an axis of the array and there are S different values of the visual characteristic, and wherein secondary image elements associated with latent image elements having a first value of the visual characteristic are displaced in accordance with the equation:

displacement $(D)=(N-1)*[(S-S_{min})/(S_N-S_{min})]$; where S is the value of the visual characteristic being displaced, $S_{min}$, is the sparsest density value of the visual characteristic and $S_N$ is the densest value of the visual characteristic.

40. The article of manufacture as claimed in claim 29 wherein primary image elements of different portions of said primary pattern are displaced in different directions relative to said secondary image elements.

41. The article of manufacture as claimed in claim 29 which constitutes a security device.

42. The article of manufacture as claimed in claim 29 which constitutes a novelty item.

43. The article of manufacture as claimed in claim 29 which forms part of a document or instrument.

44. The article of manufacture as claimed in claim 29 wherein said primary pattern is embossed on a polymer substrate.

45. An article of manufacture comprising a composite primary pattern encoding a plurality of latent images, said composite primary pattern comprising:

a plurality of superimposed primary patterns, each angled relative to one another, each primary pattern comprising a plurality of primary image elements which can be decoded by a secondary pattern comprising a plurality of secondary image elements, said primary image elements being displaced relative to respective ones of said secondary image elements, the displacement being determined on the basis of the value of the visual characteristic of latent image elements related to respective ones of said secondary image elements.

46. The article of manufacture as claimed in claim 45 wherein the same secondary pattern is capable of decoding each of the latent images.

47. The article of manufacture as claimed in claim 45 wherein different secondary patterns are required to decode each of said latent images.

48. The article of manufacture as claimed in claim 47, wherein said different secondary patterns encode different numbers of visual characteristics and said latent images have different numbers of visual characteristic to one another.

49. The article of manufacture as claimed in claim 45 wherein said primary patterns are combined to provide maximum contrast between said primary patterns.

50. The article of manufacture as claimed in claim 45 wherein said primary patterns are combined to provide contrast between said primary patterns while avoiding self-decoding effects.

51. The article of manufacture as claimed in claim 45 wherein said primary patterns are combined at 5-10 degrees from the angle which provides maximum contrast between said primary patterns.

52. The article of manufacture as claimed in claim 45 wherein there are two primary patterns combined at 90 degrees to one another.

53. The article of manufacture as claimed in claim 45 wherein there are three primary patterns, and the angles between neighboring images is in the range of 35 to 55 degrees.

54. The article of manufacture as claimed in claim 45 wherein one or more of said primary patterns is converted to a negative before said primary patterns are combined.

55. The article of manufacture as claimed in claim 45 wherein where said primary patterns overlap, image elements are combined to select for a combination of contrast and concealment.

56. The article of manufacture as claimed in claim 45 wherein said primary patterns are combined by summing together the visual characteristic of collocated image elements to obtain a combined primary pattern and dithering the combined primary pattern to obtain a black and white composite primary pattern.

57. The article of manufacture as claimed in claim 45 which constitutes a security device.

58. The article of manufacture as claimed in claim 45 which constitutes a novelty item.

59. The article of manufacture as claimed in claim 45 which forms part of a document or instrument.

60. The article of manufacture as claimed in claim 45 embossed on a polymer substrate.

* * * * *